United States Patent
Guilar (10) Patent No.: US 8,274,340 B2
(45) Date of Patent: Sep. 25, 2012

(54) PARALLEL TRANSMISSION LINES HAVING DIFFERENT PATH LENGTHS AND INCLUDING DIFFERENT PROPERTIES FOR EQUALIZING THE PATH LENGTHS THERE BETWEEN

(75) Inventor: Nathaniel Guilar, San Carlos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 278 days.

(21) Appl. No.: 12/693,490

(22) Filed: Jan. 26, 2010

(65) Prior Publication Data

US 2011/0181370 A1    Jul. 28, 2011

(51) Int. Cl.
*H01P 3/08* (2006.01)
(52) U.S. Cl. ............................... 333/1; 333/5; 333/238
(58) Field of Classification Search .................. 333/1, 4, 333/5, 238
See application file for complete search history.

(56) References Cited

U.S. PATENT DOCUMENTS

| | | | |
|---|---|---|---|
| 5,777,526 A * | 7/1998 | Kawasaki | 333/1 |
| 6,347,041 B1 * | 2/2002 | Hailey et al. | 361/777 |
| 6,940,362 B2 * | 9/2005 | Otaki et al. | 333/33 |
| 7,372,144 B2 | 5/2008 | Dutta | |
| 2002/0050870 A1 * | 5/2002 | Koga | 333/1 |

OTHER PUBLICATIONS

S.-Y. Oh et al, "A scaling scheme and optimization methodology for deep sub-micron interconnect", 1996 IEEE International Conference on Computer Design: VLSI in Computers and Processors, 1996. ICCD '96. Proceedings., Oct. 7-9, 1996, pp. 320-325.

* cited by examiner

Primary Examiner — Benny Lee (57) ABSTRACT

A signal bus includes multiple interconnects for transporting electronic signals. The interconnects have different physical path lengths and different structures to equalize the different the physical path lengths, so that the electronic signals traverse the corresponding interconnects in same period of time.

16 Claims, 5 Drawing Sheets

PARALLEL TRANSMISSION LINES HAVING DIFFERENT PATH LENGTHS AND INCLUDING DIFFERENT PROPERTIES FOR EQUALIZING THE PATH LENGTHS THERE BETWEEN

BACKGROUND

Generally, in electrical circuits having multiple interconnected functional elements, such as integrated circuits (ICs), printed circuit boards (PCBs), and the like, it is beneficial to have timing synchronization between signals applied to the various functional elements. For example, timing synchronization enables events between parallel transmitting functional elements (e.g., transmitters) and parallel receiving functional elements (e.g., receivers) to be synchronized. Timing synchronization may be achieved by equalizing propagation delays in signal path lengths of interconnects between the functional elements.

However, physical separation between functional elements varies, e.g., due to layout constraints, physical size limitations, and the like. Therefore, it is often the case that the interconnects between the functional elements have different lengths. The variations in the lengths result in timing skew between the interconnects, e.g., due to longer signal propagation times in longer interconnects, thus preventing timing synchronization. In addition, the variations in the lengths can result in mismatch across the interconnects, which can reduce overall performance of the electrical circuit or the system incorporating the electrical circuit.

One conventional approach to equalizing propagation times is to keep certain properties of the interconnects (e.g., characteristic impedance Zo and/or propagation constant $\gamma$) uniform, while adjusting the lengths of the interconnects, so that all the signal path lengths are equal. However, layout constraints, physical size limitations and the like, may prevent the necessary variations in interconnect lengths. Another conventional approach is to vary the characteristics of the transmitting and/or receiving functional elements themselves, depending on corresponding transmission distances and wire lengths. However, in order to implement this approach, multiple functional elements must be designed, which is time consuming, expensive and inefficient. Another conventional approach is to use passive devices to control the transmitted signal characteristics. However, this requires adding additional components to the circuit, such as a source terminated resistor or a matching network, which may impact cost and contribute to signal loss and other inefficiencies.

SUMMARY

In a representative embodiment, a signal bus includes multiple interconnects for transporting electronic signals. The interconnects have different physical path lengths and different structures to equalize the different the physical path lengths, so that the electronic signals traverse the corresponding interconnects in same period of time.

In another representative embodiment, an electrical circuit includes multiple parallel transmitters, multiple parallel receivers corresponding to the parallel transmitters, and multiple transmission lines connecting the parallel transmitters with the parallel receivers. Each transmission line has a different length and a different structure than at least one other transmission line, so that signals transmitted from the parallel transmitters at the same time are received at the parallel receivers at the same time.

In another representative embodiment, an integrated circuit includes first and second transmitters, first and second receivers, a first transmission line connecting the first transmitter to the first receiver, and a second transmission line connecting the second transmitter to the second receiver. The first transmission line has a first length and a first propagation constant, and the second transmission line has a second length and a second propagation constant. The first length is shorter than the second length, and the first propagation constant is greater than the second propagation constant, so that first and second signals simultaneously transmitted from the first and second transmitters are simultaneously received by the first and second receivers, respectively.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, according to various embodiments, interconnects of a signal bus connect parallel functional elements in any type of electrical circuit configured to enable electrical transmissions between the functional elements, such as an integrated circuit or a printed circuit board, for example. The interconnects have different lengths (e.g., signal path lengths) and thus different properties in order to equalize the different lengths, so that the corresponding signal propagation times are equal, where propagation time is the time period in which a signal traverses a corresponding interconnect from a transmitting functional element (e.g., transmitter) to a receiving functional element (e.g., receiver), discussed below. In addition, equalizing the different lengths enables the waveforms of the signals (e.g., square waves) to have the same overshoot (or peaking) for the short and long interconnects, and further enables the short and long interconnects to have the same loss. For example, according to various embodiments, the propagation constant of a short interconnect should be higher than that of a longer interconnect, thus equalizing the respective propagation times of the short and long interconnects. Of course, other properties of the interconnects, such as characteristic impedance, may be varied in addition to or instead of propagation constants, in order to equalize the different lengths, without departing from the scope of the present teachings. The embodiments may be incorporated into any application requiring timing control and coordination of transmitted signals or matching between functional elements, such as microprocessors, memories, application-specific integrated circuits (ASICs) and the like.

Figure 1:
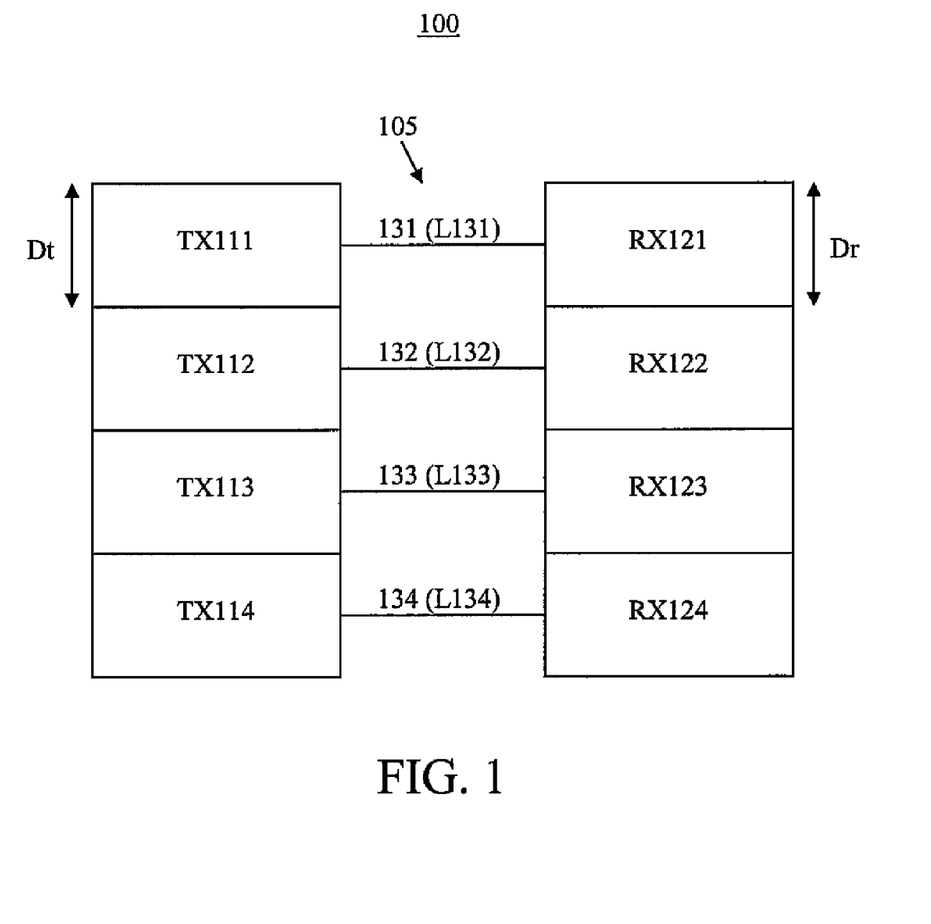
FIG. 1 is a block diagram of an electrical circuit including interconnects having equal physical lengths between functional elements.

FIG. 1 is a block diagram of an electrical circuit including interconnects having equal physical lengths between functional elements.

Referring to FIG. 1, electrical circuit 100 includes multiple functional elements, depicted as representative parallel transmitters TX111, TX112, TX113, TX114 and receivers RX121, RX122, RX123, RX124 connected to one another by signal bus 105. The signal bus 105 includes multiple interconnects between the transmitters TX111~TX114 and the receivers RX121~RX124, respectively, referred to transmission lines 131, 132, 133, 134. Throughout this disclosure, transmission lines are intended to include any type interconnect, such as coplanar lines, strip lines, microstrip lines, and the like. The transmission lines 131~134 have corresponding line lengths L131, L132, L133, L134, which are the physical lengths of the transmission lines 131~134 and the signal paths between respective sets of transmitters and receivers. Also, throughout this disclosure, the signals may include data signals, control signal, clock signals, or any other type of electrical signal.

In the depicted configuration, the transmitters TX111~TX114 and the receivers RX121~RX124 are arranged parallel to one another. Also, the pitch Dt of each of the transmitters TX111~TX114 is equal to the pitch Dr of each of the receivers RX121~RX124. Therefore, the transmission lines 131~134 are parallel to one another, and the corresponding lengths L131~L134 (which are the signal path lengths) are identical to one another (i.e., L131=L132=L133=L134). Accordingly, assuming that the transmission lines 131~134 have the same characteristic impedance Zo and the same propagation constant γ there would be no timing skew and no mismatch among the transmission lines 131~134.

Figure 2A:
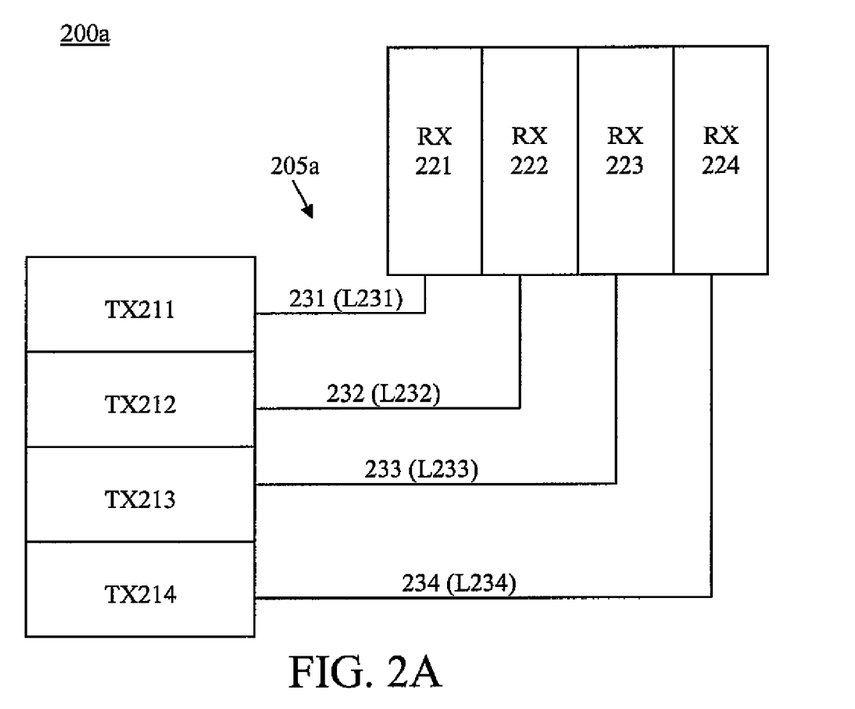
FIGS. 2A and 2B are block diagrams of electrical circuits including interconnects having different physical lengths between functional elements.
Figure 2B:
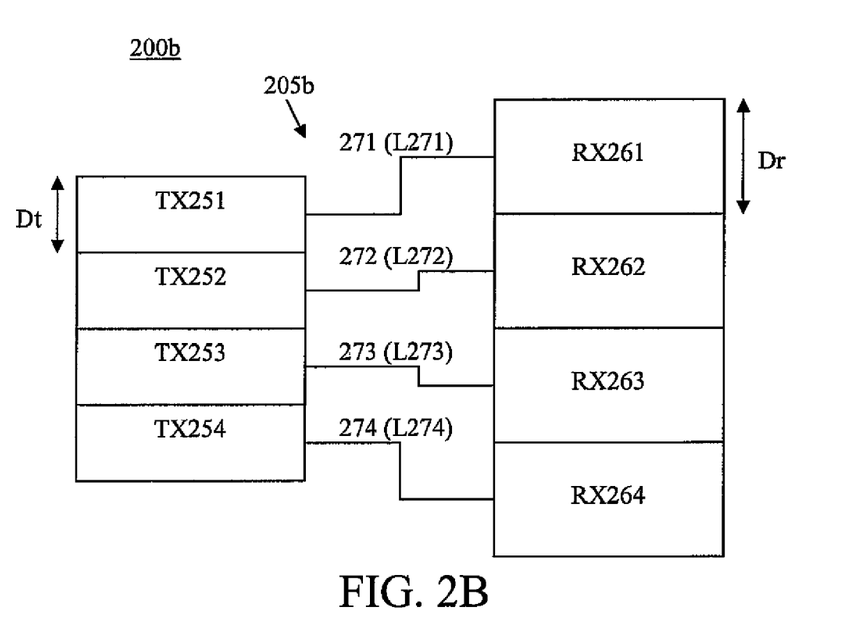

FIGS. 2A and 2B are block diagrams of electrical circuits including interconnects having unequal physical lengths between functional elements.

Referring to FIG. 2A, electrical circuit 200a includes multiple functional elements, depicted as representative parallel transmitters TX211, TX212, TX213, TX214 and receivers RX221, RX222, RX223, RX224 connected to one another by signal bus 205a. The signal bus 205a includes multiple interconnects between the transmitters TX211~TX214 and the receivers RX221~RX224, respectively, referred to transmission lines 231, 232, 233, 234. The transmission lines 231~234 have corresponding line lengths L231, L232, L233, L234.

In the depicted configuration, the transmitters TX211~TX214 and the receivers RX221~RX224 are arranged perpendicular to one another. Therefore, the transmission lines 231~234 must travel different distances, and thus have different corresponding lengths L231~L234 (i.e., L231<L232<L233<L234). Accordingly, assuming that the transmission lines 231~234 have the same characteristic impedance Zo and the same propagation constant γ there would be relative timing skew and mismatch among the transmission lines 231~234.

Similarly, referring to FIG. 2B, electrical circuit 200b includes multiple functional elements, depicted as representative parallel transmitters TX251, TX252, TX253, TX254 and receivers RX261, RX262, RX263, RX264 connected to one another by signal bus 205b. The signal bus 205b includes multiple interconnects between the transmitters TX251~TX254 and the receivers RX261~RX264, respectively, referred to transmission lines 271, 272, 273 and 274. The transmission lines 271~274 have corresponding line lengths L271, L272, L273, L274.

In the depicted configuration, the transmitters TX251~TX254 and the receivers RX261~RX264 are arranged generally parallel to one another. However, the pitch Dt of each of the transmitters TX251~TX254 is less than the pitch Dr of each of the receivers RX261~RX264. Therefore, the transmission lines 271 and 274 must travel different distances than the transmission lines 272 and 273, and thus have different corresponding lengths L271, L274 versus L272, L273 (i.e., L271=L274; L272=L273; L272, L273<L271, L274). Accordingly, assuming that the transmission lines 271~274 have the same characteristic impedance Zo and the same propagation constant γ, there would be relative timing skew and mismatch among the transmission lines 271~274.

According to various embodiments, the propagation constant γ of the transmission lines of a signal bus may be varied in order to adjust the signal propagation times, so that the signals pass through the respective transmission lines over the same period of time. Of course, other properties of the transmission lines affecting the timing of signal propagation may be varied, such as characteristic impedances Zo, in addition to or instead of the propagation constant γ, without departing from the scope of the present teachings, as discussed below.

Figure 3:
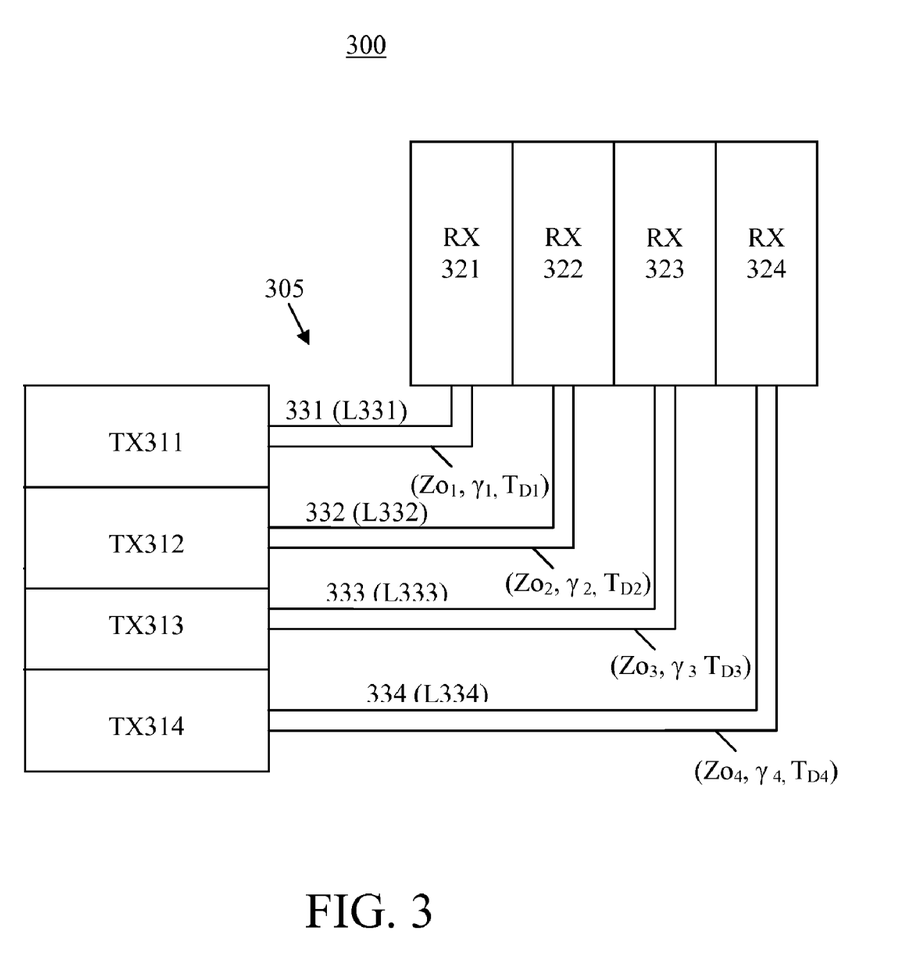
FIG. 3 is a block diagram of an integrated circuit, according to a representative embodiment.

FIG. 3 is a block diagram of an electrical circuit including interconnects having unequal physical lengths between functional elements, according to a representative embodiment.

Referring to FIG. 3, electrical circuit 300 includes multiple functional elements, depicted as representative parallel transmitters TX311, TX312, TX313, TX314 and receivers RX321, RX322, RX323, RX324 connected to one another by signal bus 305. The signal bus 305 includes multiple interconnects between the transmitters TX311~TX314 and the receivers RX321~RX324, respectively, referred to transmission lines 331, 332, 333, 334. The transmission lines 331~334 have corresponding line lengths L331, L332, L333, L334.

In the depicted configuration, the transmitters TX311~TX314 and the receivers RX321~RX324 are arranged perpendicular to one another, similar to the arrangement of signal bus 205a shown in FIG. 2A. Therefore, the transmission lines 331~334 must travel different distances, and thus have different corresponding lengths L331~L334 (i.e., L331<L332<L333<L334). However, unlike the signal bus 205a, the transmission lines 331~334 have different characteristic impedances $Zo_1$, $Zo_2$, $Zo_3$, $Zo_4$ and different propagation constants $\gamma_1$, $\gamma_2$, $\gamma_3$, $\gamma_4$, and thus different corresponding time delays per unit length. The values of the characteristic impedances $Zo_1$~$Zo_4$ and propagation constants $\gamma_1$~$\gamma_4$ are selected to effectively equalize the delays $T_{D1}$~$T_{D4}$ of the transmission lines 331~334. Accordingly, the waveforms of the signals traversing the transmission lines 331~334 arrive at the receivers RX321~RX324 at the same time, eliminating the timing skew. Also, for a square wave (like a clock signal) or a step, the waveforms have the same overshoot (or peaking) for the transmission lines 331~334, as discussed further with reference to FIGS. 5A and 5B. Further, the transmission lines 331~334 have the same loss, eliminating mismatch among the transmission lines 331~334. In other words, each of the transmission lines 331~334 has been tailored for the individual required transmission length, such that corresponding signals sent by the transmitters TX311~TX314 at the same time, traverse the transmission lines 331~334 at different propagation rates and are received by the corresponding receivers 321~324 at the same time and with the same waveform shape. Generally, the propagation constants $\gamma_1$~$\gamma_4$ affect the time delays per unit length $T_{D1}$~$T_{D4}$ and the characteristic impedances $Z_{o1}$~$Z_{o4}$ interact with driving impedance from the transmitters TX311~TX314 and load impedance from the receivers RX321~RX324 to determine the respective wave shape and the reflections over the corresponding transmission line.

As shown in FIG. 3, the transmission line 331 has characteristic impedance $Z_{o1}$ and propagation constant $\gamma_1$, the transmission line 332 has characteristic impedance $Z_{o2}$ and propagation constant $\gamma_2$, the transmission line 333 has characteristic impedance $Z_{o3}$ and propagation constant $\gamma_3$ and transmission line 334 has characteristic impedance $Z_{o4}$ and propagation constant $\gamma_4$. Generally, in order to reduce timing skew, a transmission line with a shorter physical length (e.g., transmission line 331) requires a larger propagation constant $\gamma$ than a transmission line with a longer physical length (e.g., transmission line 334). Thus, in the representative configuration depicted in FIG. 3, $\gamma_1 > \gamma_2 > \gamma_3 > \gamma_4$. By selecting the correct time delays per unit length $T_{D1}$~$T_{D4}$, when the parallel transmitters TX311~TX314 initiate transmission in unison, the receivers RX321~RX324 receive the signals at the same time.

As discussed above, the propagation constants $\gamma$ and characteristic impedance $Z_o$ of a transmission line can be adjusted by changing various properties of the signal and the transmission line, including angular frequency $\omega$ of the signal and resistance per unit length (R), inductance per unit length (L), capacitance per unit length (C) and conductance per unit length (G) of the transmission line, as indicated by Equation (1) and Equation (2), below:

$$\gamma = \sqrt{(R + j\omega L)(G + j\omega C)} \quad (1)$$

$$Z_o = \sqrt{\frac{R + j\omega L}{G + j\omega C}} \quad (2)$$

Therefore, the propagation constant $\gamma$ and the characteristic impedance $Z_o$ of the transmission line may be changed by changing one or more of the resistance per unit length (R), inductance per unit length (L), capacitance per unit length (C) and conductance per unit length (G) of the transmission line. This may be accomplished using a variety of techniques, including, but not limited to, varying the physical size (e.g., width and/or thickness) of the transmission line, varying the shape or geometry of the transmission line, changing the proximity of a signal conducting portion of the transmission line to ground portions (or other signal portions), constructing the transmission line from different metal layers or materials, inserting transmission line stubs, and/or varying effective permittivity of dielectric material between the signal conducting and ground portions (or other signal portions) of the transmission line.

Figure 4A:
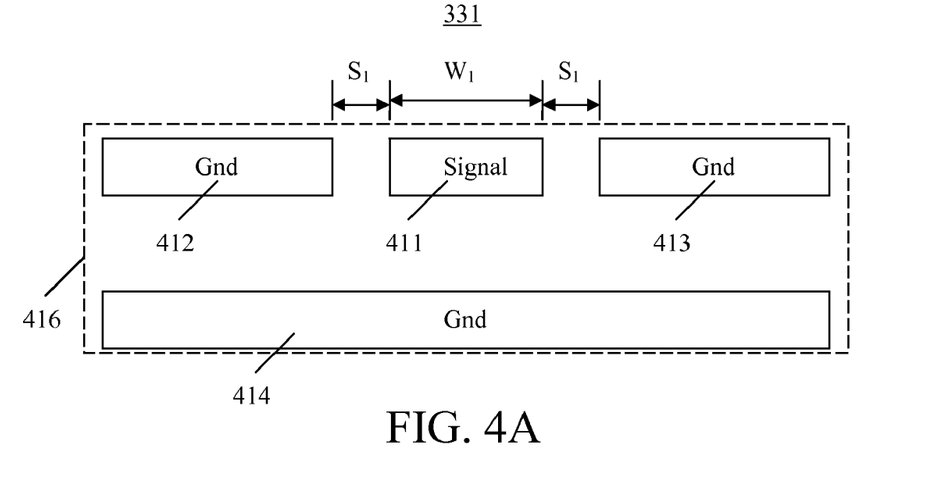
FIGS. 4A and 4B are cross-sections of interconnects shown in FIG. 3, according to a representative embodiment.
Figure 4B:
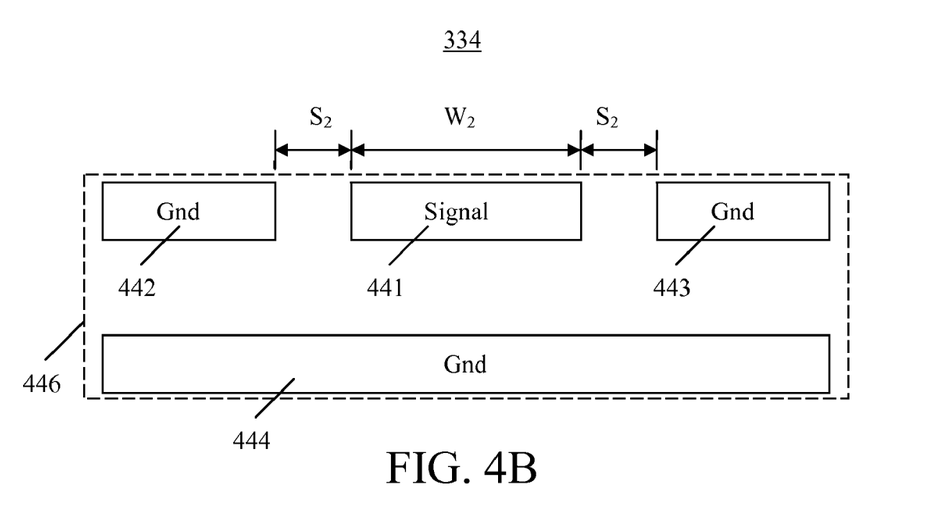

FIGS. 4A and 4B are cross-sections of interconnects shown in FIG. 3, according to a representative embodiment, showing variations in configuration affecting respective time delays per unit length and other characteristics. Single ended signals are shown in FIGS. 4A and 4B for simplicity. However, various embodiments may incorporate other signaling techniques and/or types of transmission lines, such as fully-differential signaling, pseudo-differential signaling, common mode signaling, and the like, without departing from the scope of the present teachings.

More particularly, FIG. 4A depicts an example of representative transmission line 331 of FIG. 3 (connecting transmitter TX311 and receiver RX321), which is assumed to be a coplanar waveguide for purposes of discussion, although other types of transmission lines may be incorporated without departing from the scope of the present teachings. Because the transmission line 331 is the shortest of the four transmission lines 331~334 shown in FIG. 3, its propagation constant $\gamma_1$ must be relatively high. In comparison, FIG. 4B depicts an example of representative transmission line 334 of FIG. 3 (connecting transmitter TX314 and receiver RX324), which is also assumed to be a coplanar waveguide for purposes of discussion. Because the transmission line 334 is the longest of the four transmission lines 331~334, its propagation constant $\gamma_4$ must be relatively low, particularly as compared to the propagation constant $\gamma_1$ of transmission line 331, so that the propagation times of signals respectively traversing the transmission lines 331 and 334 are substantially the same.

Referring to FIG. 4A, the transmission line 331 includes signal conductor 411 and ground conductors 412, 413, 414 formed on or in dielectric 416. The signal conductor 411 has a first width $W_1$, and the signal conductor 411 is separated from each of the ground conductors 412 and 413 by a first separation distance $S_1$. Referring to FIG. 4B, the transmission line 334 includes signal conductor 441 and ground conductors 442, 443, 444 formed on or in dielectric 446. The signal conductor 441 has a second width $W_2$, and the signal conductor 441 is separated from each of the ground conductors 442 and 443 by a second separation distance $S_2$.

In order to compensate for the shorter length L331 of the transmission line 331, e.g., to reduce the skew between the shorter length L331 and the longer length L334, the first width $W_1$ of the signal conductor 411 is less than the second width $W_2$ of the signal conductor 441. Also, the first separation distance $S_1$ is less than the second separation distance $S_2$. Generally, referring to Equation (1), variations in signal conductor width ($W_1$, $W_2$) affect resistance per unit length (R) of the transmission line (331, 334), where decreases in the width ($W_1$, $W_2$) increase resistance per unit length (R), thus increasing the propagation constant ($\gamma_1$, $\gamma_4$) and corresponding time delay per unit length. Meanwhile, variations in separation distance ($S_1$, $S_2$) affect the capacitance per unit length (C) of the transmission line (331, 334), where decreases in the separation distance ($S_1$, $S_2$) increase capacitance per unit length (C), thus increasing the propagation constant ($\gamma_1$, $\gamma_4$) and corresponding time delay per unit length.

Accordingly, the transmission line 331 having the shorter length L331 is designed with higher resistance per unit length (R) and higher capacitance per unit length (C) than the transmission line 334 having the longer length L334, so that the propagation constant $\gamma_1$ is greater than propagation constant $\gamma_4$, so that the time delay per unit length of the transmission line 331 is greater than the time delay per unit length of the transmission line 334. In the depicted example, the larger resistance per unit length (R) is accomplished using a narrower signal conductor ($W_1 < W_2$), and the larger capacitance per unit length (C) is accomplished by using a smaller separation distance between signal and ground conductors ($S_1 < S_2$). The other representative transmission lines 332 and 333 of the signal bus 305, having intermediate lengths L332 and L333 falling between L331 and L334, are similarly designed to have respective resistance and capacitance values that cause the corresponding propagation constants $\gamma_2$, $\gamma_3$ to be less than the propagation constant $\gamma_1$ but greater than the propagation constant $\gamma_4$. Accordingly, the signals are transported through the corresponding transmission lines 331~334 over the same period of time. In other words, signals transmitted over the signal bus 305 by the transmitters TX311~TX314 at the same time are received by the receivers RX321~RX324 at the same time, even though they traverse signal paths of different lengths.

Of course, the structure of the transmission lines (e.g., transmission lines 331~334) may differ depending on signaling techniques. For example, for fully-differential signaling, the transmission lines may include two signal conductors (e.g., corresponding to signalPlus and signalMinus), However, the resistance per unit length (R) and/or the capacitance per unit length (C) of the differently structured transmission lines may be varied in order to equalize the corresponding transmission line lengths according to the same illustrative techniques discussed above.

Further, in various embodiments, when the waveforms of the signals traversing transmission lines 331~334 are square waves or steps, for example, the waveforms will have the same overshoot or peaking, as discussed with reference to FIGS. 5A and 5B. The overshoot affects the dampening or quality factor (Q) of each of the transmission lines 331~334, which may be modeled as a second order system, indicated by Equation (3), below:

$$Q=(1/R)(\sqrt{L/C}) \tag{3}$$

Figure 5A:
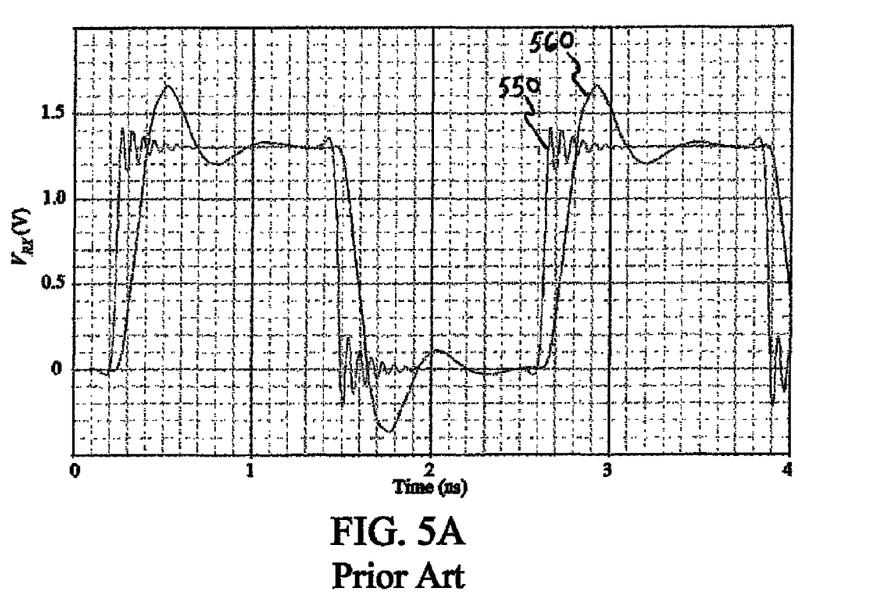
FIGS. 5A and 5B are traces of waveforms for comparing signal responses of a conventional electrical circuit and an electrical circuit according to a representative embodiment.

A larger quality factor (Q) has little dampening, which results in more ringing and overshoot (e.g., waveform 560 in FIG. 5A). A smaller quality factor (Q) indicates a well damped transmission line, where there is little to no overshoot (e.g., waveform 580 from FIG. 5B). Generally, little to no overshoot improves reliability. As shown in Equation (3), inductance (L) is proportional to the quality factor (Q), and resistance (R) and capacitance (C) are inversely proportional to the quality factor (Q). Therefore, assuming a shorter transmission line (e.g., transmission line 331) has less total capacitance (C), for example, it should have more resistance (R) and/or less inductance (L) in order to have the same quality factor (Q) as a longer transmission line (e.g., transmission line 334).

Figure 5B:
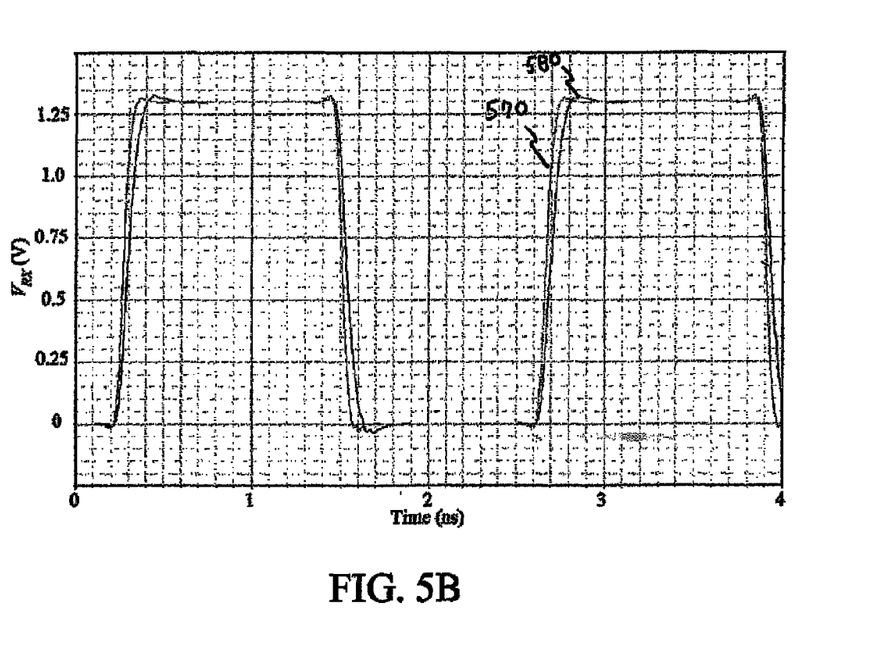

FIGS. 5A and 5B are traces of waveforms measured over time in nanoseconds (ns) for comparing signal responses of a conventional electrical circuit and an electrical circuit according to a representative embodiment, respectively.

FIG. 5A shows two waveforms 550 and 560 for received voltage $V_{RX}$ from two corresponding transmission lines having different line lengths, respectively, according to a conventional implementation in which the two transmission lines have the same propagation constant $\gamma$ and the same characteristic impedance Zo. The relative timing skew and overshoot of the waveforms 550 and 560 are apparent.

FIG. 5B shows two waveforms 570 and 580 for received voltage $V_{RX}$ from two corresponding transmission lines (e.g., transmission lines 331, 334) having different line lengths (e.g., lengths L331, L334), respectively, according to a representative embodiment. That is, the two transmission lines have been tuned, using different propagation constants ($\gamma_1$, $\gamma_4$) and corresponding time delay per unit lengths, and possibly different characteristic impedances Zo, as discussed above, so that the signals arrive at the corresponding receivers at substantially the same time. As shown in FIG. 5B, the timing skew and overshoot waveforms 570 and 580 have been reduced, as compared to waveforms 550 and 560, discussed above.

Also, in various embodiments, the transmission lines 331~334 have the same loss, as mentioned above. That is, the amplitudes of the respective waveforms at the receivers RX321~RX324 are the same. The various embodiments enable compensation for timing skew and signal loss at the same time.

For example, in an embodiment involving low frequency signals and resistive loads, amplitude may be equalized primarily by having the same total resistance (R) across each of the transmission lines 331~334, indicated by Equation (4), below:

$$R_{short}*\text{Length}_{short}=R_{Long}*\text{Length}_{Long} \tag{4}$$

In this example, referring to FIGS. 3, 4A and 4B, the total resistance across short transmission line 331 (i.e., $R_{short}$) multiplied by corresponding line length L331 (i.e., $\text{Length}_{short}$) is equal to the total resistance across long transmission line 334 (i.e., $R_{Long}$) multiplied by corresponding line length L334 (i.e., $\text{Length}_{Long}$). The variation in total resistances may attained, for example, by using thin wire for the short transmission line and thick wire for the long transmission line, although the total resistances may be varied using other techniques, without departing form the scope of the present teachings.

In alternative embodiments, manipulation of the propagation constants $\gamma$ (as well as characteristic impedances Zo) to compensate for different transmission line lengths is not limited to varying resistance per unit length (R) and/or capacitance per unit length (C). Rather, inductance per unit length (L) and/or conductance per unit length (G) may be altered to obtain the same end result, in addition to or in place of variations of resistance per unit length (R) and/or capacitance per unit length (C). However, varying resistance per unit length (R) and capacitance per unit length (C) is generally more easily implemented in typical IC fabrication processes. Also, manipulation of the propagation constants $\gamma$ (as well as characteristic impedances Zo) may involve varying only resistance per unit length (R) or capacitance per unit length (C), but not both. For example, a shorter transmission line may be formed of a less conductive material than a longer transmission line. The less conductive material has a higher resistance per unit length (R), which would increase the propagation constant $\gamma$ of the shorter transmission line.

Likewise, in alternative embodiments, resistance per unit length (R) and/or capacitance per unit length (C) may be manipulated by various alternative means to compensate for different transmission line lengths. For example, referring again to FIGS. 4A and 4B, the permittivity of the dielectric 416 between the signal conductor 411 and the ground conductors 412 and 413 of the transmission line 331 may be increased, so that it is greater than the permittivity of the dielectric 446 between the signal conductor 441 and the ground conductors 442 and 443 of the transmission line 334. The increased permittivity decreases the insulating properties of the dielectric 416, and thus increases the capacitance per unit length (C) of the transmission line 331. As discussed above, the increased capacitance per unit length (C) increases the propagation constant $\gamma_1$ and thus the time delay per unit length of the transmission line 331.

In addition to equalizing for timing skew, the various embodiments may also compensate for non-ideal transmitter loading. Non-ideal transmitter loading causes overshoot or ringing in the transient response, which may result in signals spiking above the power supply. Over time, signal spikes degrade the active circuitry, possibly resulting in system failure. Overshoot is caused, in part, by mismatch between transmitter driving strength and equivalent load on the transmitter. The equivalent load on the transmitter is often dominated by characteristics of the physical transmission line connecting the transmitter to the receiver. According to various embodiments, the quality factor (Q) of each transmission line can be tuned to better match with the requirements of the transmitter for each corresponding transmission line length. Matching transmitters and corresponding transmission lines reduces unwanted overshoot and prolongs the life of the system. Also, the various embodiments enable compensation for timing skew and overshoot at the same time.

Also, time interleaved systems typically include multiple wafers or slices for integrated circuits and other microelectronic devices. The capacities of the slices may be combined, for example, to increase total throughput. Mismatch between the slices degrades system performance. However, this mismatch may be eliminated or reduced, in accordance with the various embodiments discussed above, by equalizing transmission lines within and among the multiple slices. Therefore, a larger number of parallel slices can operate in parallel, while maintaining performance levels.

The various embodiments are relatively simple, and require no additional power or circuit elements to implement. Also, the parallel transmission lines are able to increase the number of time interleaved channels resulting in higher throughput without additional timing skew. Furthermore, designing multiple interconnects is simpler than designing multiple transmitters, and can be automated.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A signal bus connecting at least one transmitter with at least one receiver, the signal bus comprising:
   a plurality of interconnects for transporting electronic signals, the plurality of interconnects having different physical path lengths, each interconnect of the plurality of interconnects having at least one property different from a corresponding at least one property of another interconnect in order to equalize the different physical path lengths, so that the electronic signals traverse the corresponding plurality of interconnects in a same period of time,
   wherein the at least one property of each interconnect comprises at least one of resistance per unit length, inductance per unit length, capacitance per unit length and conductance per unit length of the interconnect.

2. The signal bus of claim 1, wherein the plurality of interconnects have different corresponding propagation constants.

3. The signal bus of claim 2, wherein a first interconnect of the plurality of interconnects, having a shorter physical length than a second interconnect of the plurality of interconnects, has a greater propagation constant than the second interconnect.

4. The signal bus of claim 2, wherein the plurality of interconnects have different corresponding resistances per unit length.

5. The signal bus of claim 2, wherein the plurality of interconnects have different corresponding capacitances per unit length.

6. The signal bus of claim 1, wherein the electronic signals comprise waveforms having minimal overshoot.

7. The signal bus of claim 1, wherein the plurality of interconnects have the same line loss.

8. The bus of claim 1, wherein the electronic signals include data signals.

9. The bus of claim 1, wherein the electronic signals include clock signals.

10. An integrated circuit, comprising:
    first and second transmitters;
    first and second receivers;
    a first transmission line connecting the first transmitter to the first receiver, the first transmission line having a first length and a first propagation constant; and
    a second transmission line connecting the second transmitter to the second receiver, the second transmission line having a second length and a second propagation constant,
    wherein the first length is shorter than the second length, and the first propagation constant is greater than the second propagation constant, so that first and second signals simultaneously transmitted from the first and second transmitters are simultaneously received by the first and second receivers, respectively, and
    wherein the first and second transmission lines comprise first and second coplanar waveguides, respectively, the first coplanar waveguide comprising a first signal conductor and a first ground conductor separated from the first signal conductor by a first separation distance, and the second coplanar waveguide comprising a second signal conductor and a second ground conductor separated from the second signal conductor by a second separation distance.

11. The integrated circuit of claim 10, wherein the first signal conductor has a smaller width than the second signal conductor.

12. The integrated circuit of claim 10, wherein the first separation distance is less than the second separation distance.

13. The integrated circuit of claim 10, wherein the first ground conductor is separated from the first signal conductor by a first dielectric material having a first permittivity, and the second ground conductor is separated from the second signal conductor by a second dielectric material having a second permittivity, the first permittivity being greater than the second permittivity.

14. An integrated circuit, comprising:
    first and second transmitters;
    first and second receivers;
    a first transmission line connecting the first transmitter to the first receiver, the first transmission line having a first length and a first propagation constant; and
    a second transmission line connecting the second transmitter to the second receiver, the second transmission line having a second length and a second propagation constant,
    wherein the first length is shorter than the second length, and the first propagation constant is greater than the second propagation constant, so that first and second signals simultaneously transmitted from the first and second transmitters are simultaneously received by the first and second receivers, respectively, and
    wherein the first transmission line has a greater capacitance per unit length than the second transmission line.

15. The integrated circuit of claim 14, wherein the first transmission line has a greater resistance per unit length than the second transmission line.

16. The signal bus of claim 14, wherein the first and second signals transmitted from the first and second transmitters at the same time comprise data signals or clock signals.

* * * * *